United States Patent
Ishigaki et al.

(10) Patent No.: US 11,254,807 B2
(45) Date of Patent: Feb. 22, 2022

(54) CHLOROPRENE POLYMER AND PRODUCTION METHOD THEREFOR

(71) Applicant: DENKA COMPANY LIMITED, Tokyo (JP)

(72) Inventors: Yuhei Ishigaki, Itoigawa (JP); Shogo Hagiwara, Itoigawa (JP); Uichiro Yamagishi, Itoigawa (JP); Suguru Onuki, Itoigawa (JP); Kosuke Fujimoto, Itoigawa (JP); Wataru Nishino, Itoigawa (JP)

(73) Assignee: Denka Company Limited, Tokyo (JP)

( * ) Notice: Subject to any disclaimer, the term of this patent is extended or adjusted under 35 U.S.C. 154(b) by 190 days.

(21) Appl. No.: 16/631,594

(22) PCT Filed: Jul. 20, 2018

(86) PCT No.: PCT/JP2018/027253
§ 371 (c)(1),
(2) Date: Jan. 16, 2020

(87) PCT Pub. No.: WO2019/017470
PCT Pub. Date: Jan. 24, 2019

(65) Prior Publication Data
US 2020/0165421 A1    May 28, 2020

(30) Foreign Application Priority Data
Jul. 21, 2017    (JP) .............................. JP2017-141801

(51) Int. Cl.
*C08L 15/02* (2006.01)
*C08F 36/18* (2006.01)
*C09J 115/02* (2006.01)

(52) U.S. Cl.
CPC .............. *C08L 15/02* (2013.01); *C08F 36/18* (2013.01); *C09J 115/02* (2013.01)

(58) Field of Classification Search
CPC .......... C08L 15/02; C08L 11/00; C08L 11/02; C09J 115/02; C09J 111/00; C09J 111/02; C08F 8/34; C08F 2/24; C08F 2/38
See application file for complete search history.

(56) References Cited

U.S. PATENT DOCUMENTS

| | | | |
|---|---|---|---|
| 2009/0036608 A1 * | 2/2009 | Ozoe ..................... | C09J 153/02 525/212 |
| 2010/0255329 A1 | 10/2010 | Couvreur | |
| 2011/0015360 A1 | 1/2011 | Achten et al. | |
| 2012/0130008 A1 | 5/2012 | Tamai et al. | |
| 2015/0259520 A1 | 9/2015 | Kobayashi et al. | |
| 2016/0264686 A1 * | 9/2016 | Nemoto ................. | C08F 14/14 |

FOREIGN PATENT DOCUMENTS

| | | |
|---|---|---|
| CN | 1495161 A | 5/2004 |
| CN | 101263170 A | 9/2008 |
| CN | 102803303 A | 11/2012 |
| CN | 105745229 A | 7/2016 |
| JP | H03-093813 A | 4/1991 |
| JP | 2000-515181 A | 11/2000 |
| JP | 2002-508409 A | 3/2002 |
| JP | 2004-115517 A | 4/2004 |
| JP | 2006-143899 A | 6/2006 |
| JP | 2007-091882 A | 4/2007 |
| JP | 2007-297502 A | 11/2007 |
| JP | 2010-534264 A | 11/2010 |
| WO | WO 98/01478 A1 | 1/1998 |
| WO | WO 99/31144 A1 | 6/1999 |

(Continued)

OTHER PUBLICATIONS

European Patent Office, Supplementary European Search Report in European Patent Application No. 18834681.1 (dated May 7, 2020).
International Bureau of WIPO, International Preliminary Report on Patentability in International Application No. PCT/JP2018/027253 (dated Jan. 30, 2020).
Moad et al., "Living Radical Polymerization by the RAFT Process—A Second Update," *Aust. J. Chem.* 62: 1402-1472 (2009).
"Statistical Analyses of Monomer Distributions and Number Average Sequence Lengths," *Polymer Sequence Determination Carbon-13 NMR Method*, J.S. Randall, Editor, Academic Press, Chapter 4, pp. 71-92 (1977).

(Continued)

*Primary Examiner* — Christopher M Rodd
(74) *Attorney, Agent, or Firm* — Leydig, Voit & Mayer Ltd.

(57) ABSTRACT

Provided is a chloroprene-based polymer having an industrially applicable sufficient molecular weight and capable of obtaining a vulcanized rubber excellent in durability and fatigue endurance and an adhesive excellent in layer separation resistance. A chloroprene-based polymer having a number average molecular weight Mn of 150000 to 300000 and comprising a functional group of a structure represented by the general formula (1) or (2) below:

[Chemical Formula 1]

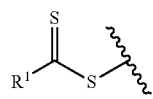

(1)

[Chemical Formula 2]

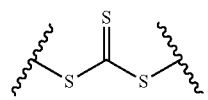

(2)

(wherein in the general formula (1), R1 shows hydrogen, chlorine, a substituted or unsubstituted alkyl group, a substituted or unsubstituted alkenyl group, a substituted or unsubstituted aryl group, or a substituted or unsubstituted heterocyclyl group.)

22 Claims, 1 Drawing Sheet

(56) References Cited

FOREIGN PATENT DOCUMENTS

| WO | WO 2009/016320 A2 | 2/2009 | |
|---|---|---|---|
| WO | WO 2014/041856 A1 | 3/2014 | |
| WO | WO 2014/054388 A1 | 4/2014 | |
| WO | WO-2015072585 A1 * | 5/2015 | ................ C08F 2/12 |

OTHER PUBLICATIONS

Pullan et al., "Reversible addition-fragmentation chain transfer polymerization of 2-chloro-1,3-butadiene," *Polym. Chem.* 4: 2272-2277 (2013).

Hui et al., "Reversible-deactivation radical polymerization of chloroprene and the synthesis of novel polychloroprene-based block copolymers by the RAFT approach," *RSC Advance* 4: 55529-55538 (2014).

Japan Patent Office, International Search Report in International Application No. PCT/JP2018/027253 (dated Oct. 23, 2018).

Japan Patent Office, Written Opinion in International Application No. PCT/JP2018/027253 (dated Oct. 23, 2018).

International Bureau of WIPO, International Preliminary Report on Patentability in International Application No. PCT/JP2018/027253 (dated Jan. 21, 2020).

China National Intellectual Property Administration, Office Action in Chinese Patent Application No. 201880048231.6 (dated Dec. 20, 2021).

* cited by examiner

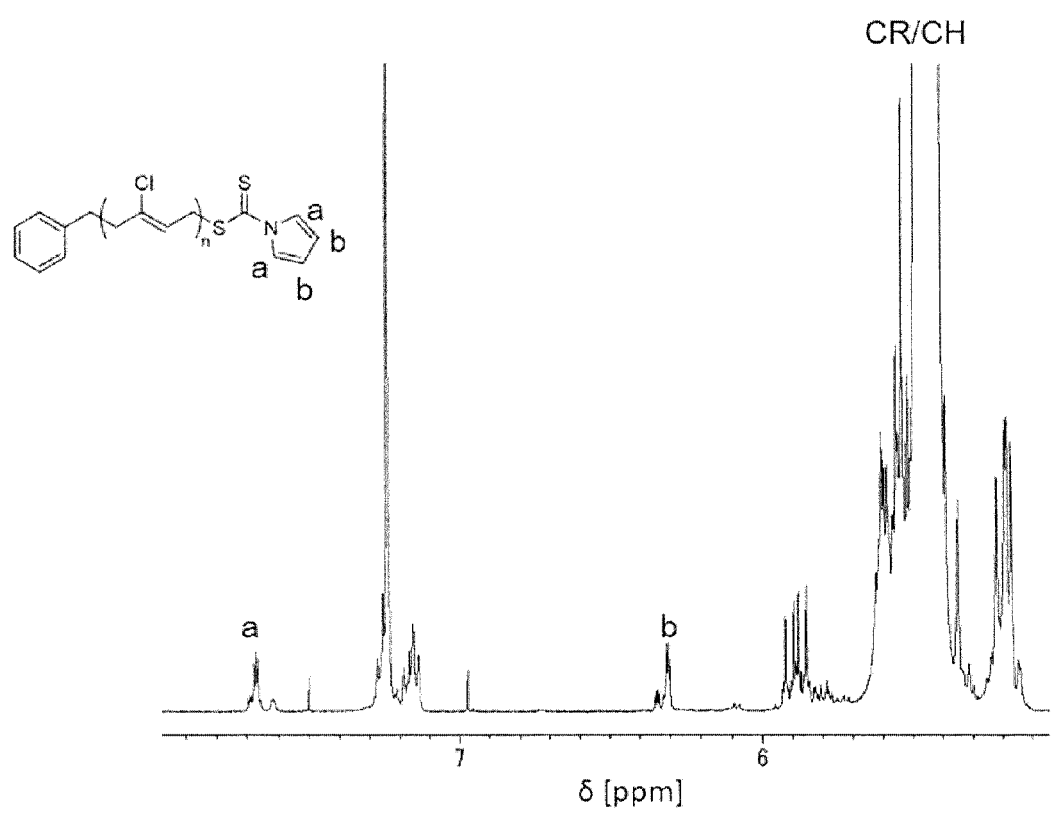

CHLOROPRENE POLYMER AND PRODUCTION METHOD THEREFOR

CROSS-REFERENCE TO RELATED APPLICATIONS

This patent application is the U.S. national phase of International Application No. PCT/JP2018/027253, filed on Jul. 20, 2018, which claims the benefit of Japanese Patent Application No. 2017-141801, filed Jul. 21, 2017, the disclosures of which are incorporated herein by reference in their entireties for all purposes.

TECHNICAL FIELD

The present invention relates to a chloroprene-based polymer having a number average molecule weight Mn of 150000 to 300000 and comprising a functional group of a specific structure.

BACKGROUND ART

A chloroprene rubber is a general purpose rubber used in various applications because of being excellent in heat resistance, weatherability, ozone resistance, chemical resistance, flame retardancy, and the like. The molecular weight of polychloroprene is adjusted by changing the amount of a chain transfer agent such as mercaptans or xanthogen disulfides. However, the chloroprene rubber is produced by radical emulsion polymerization, and thus, chain transfer agents that can be used are limited and it was not possible to easily change terminal functional groups, which markedly affect the rubber physical properties. Control by RAFT polymerization, which is one of living radical polymerizations, has recently attracted attention, and it has been found that it can be applied in production of a chloroprene rubber (e.g., see Patent Literatures 1 to 3 and Non Patent Literatures 1 to 2). In these literatures, it is disclosed that the terminal structure can also be controlled.

CITATION LIST

Patent Literature

Patent Literature 1: Japanese Unexamined Patent Application Publication (Translation of PCT Application) No. 2002-508409
Patent Literature 2: Japanese Unexamined Patent Application Publication No. 2007-297502
Patent Literature 3: Japanese Unexamined Patent Application Publication No. 2004-115517

Non Patent Literature

Non Patent Literature 1: Polymer Chemistry, 2013, 4, 2272.
Non Patent Literature 2: RSC Advance, 2014, 4, 55529.

SUMMARY OF INVENTION

Technical Problem

However, in the literatures described above, although synthesis of polymers having narrow molecular weight distribution has succeeded, the obtained polymer has small number average molecule weight and does not have sufficient molecular weight that can tolerate industrial applications, and also, there is a problem that industrial feasibility is low with respect to the emulsion system and polymerization conditions.

Then, it is a primary object of the present invention to provide a chloroprene-based polymer having an industrially applicable sufficient molecular weight and capable of obtaining a vulcanized rubber excellent in durability and fatigue endurance and an adhesive excellent in layer separation resistance.

Solution to Problem

That is, the present invention provides a chloroprene-based polymer having a number average molecular weight Mn of 150000 to 300000 and comprising a functional group of a structure represented by the general formula (1) or (2) below:

[Chemical Formula 1]

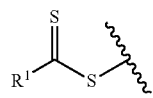

(1)

[Chemical Formula 2]

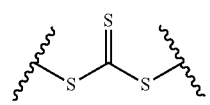

(2)

(wherein in the general formula (1), $R^1$ shows hydrogen, chlorine, a substituted or unsubstituted alkyl group, a substituted or unsubstituted alkenyl group, a substituted or unsubstituted aryl group, or a substituted or unsubstituted heterocyclyl group.)

The chloroprene-based polymer may have a functional group of a structure represented by the above general formula (1).

In the chloroprene-based polymer, the molecular weight distribution Mw/Mn, which is a ratio of the weight average molecular weight Mw to the number average molecular weight Mn, may be 1.5 to 5.0.

The chloroprene-based polymer may be a homopolymer of a chloroprene monomer.

The chloroprene-based polymer may be a statistical copolymer consisting of a chloroprene monomer and a monomer copolymerizable with the chloroprene monomer.

The monomer copolymerizable with the chloroprene monomer may be at least one selected from the group consisting of 2,3-dichloro-1,3-butadiene, 1-chloro-1,3-butadiene, acrylic acid, an acrylate, methacrylic acid, a methacrylate, acrylamide, an unsaturated nitrile, and an aromatic vinyl compound.

The present invention also provides a method for producing the chloroprene-based polymer, wherein, a solution (A) in which a chain transfer agent represented by the general formula (3) or (4) below is added to 100 parts by mass of a total monomer to achieve a ratio of the amount of substance of the total monomer to that of the chain transfer agent $[M]_0/[CTA]$ at the start of polymerization of 5/1 to 500/1 and 500 to 5000 parts by mass of an aqueous solution (B) of 0.1 to 10% by mass of an emulsifier are mixed and emulsified, then, radical polymerization is performed, and 100 to 5000 parts by mass of a chloroprene monomer singly or of a chloroprene monomer and a monomer copolymerizable with the chloroprene monomer is/are additionally added when the polymerization ratio reaches 20 to 50%.

[Chemical Formula 3]

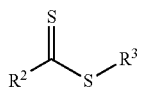

(3)

[Chemical Formula 4]

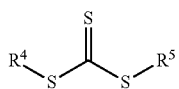

(4)

(wherein in the general formula (3), $R^2$ shows hydrogen, chlorine, a substituted or unsubstituted alkyl group, a substituted or unsubstituted alkenyl group, a substituted or unsubstituted aryl group, or a substituted or unsubstituted heterocyclyl group; and in the general formulas (3) and (4), $R^{3\ to\ 5}$ each independently show a substituted or unsubstituted alkyl group, a substituted or unsubstituted and saturated or unsaturated aromatic carbocycle, a substituted or unsubstituted and saturated or unsaturated aromatic heterocycle, an organometallic species, or any polymer chain.)

In the method for producing the chloroprene-based polymer, the final polymerization ratio after the additional addition may be 50% or more.

The method for producing the chloroprene-based polymer may be one in which the chain transfer agent represented by the above general formula (3) is added.

The present invention also provides a composition comprising the chloroprene-based polymer.

The composition may further comprise at least one selected from the group consisting of a natural rubber, an isoprene rubber, a butyl rubber, a nitrile rubber, a hydrogenated nitrile rubber, a butadiene rubber, a styrene butadiene rubber, and an ethylene propylene rubber.

The present invention also provides an adhesive composition comprising the composition.

The present invention also provides an adhesive comprising the adhesive composition.

The layer separation resistance of the adhesive composition or the adhesive may be 8 weeks or more.

The present invention also provides a vulcanized rubber comprising the composition.

The vulcanized rubber may be one in which there is no cracking when Demattia flex fatigue test has been run one million times.

The present invention also provides an antivibration rubber, a belt, a component for an overhead vehicle, an antiseismic rubber, a hose, a wiper, an immersion product, a seal component, boots, a rubberized cloth, a rubber roll, or a sponge product, in which the vulcanized rubber is used.

The present invention also provides a latex comprising the chloroprene-based polymer.

The latex may be for an adhesive or for a vulcanized rubber.

Advantageous Effects of Invention

According to the present invention, it is possible to provide a chloroprene-based polymer having an industrially applicable sufficient molecular weight and capable of obtaining a vulcanized rubber excellent in durability and fatigue endurance and an adhesive excellent in layer separation resistance. Particularly, according to the present invention, it is possible to provide a vulcanized rubber excellent in durability and fatigue endurance and an adhesive excellent in layer separation resistance.

BRIEF DESCRIPTION OF DRAWING

FIG. 1 is a diagram showing a 1H-NMR spectrum of a chloroprene-based polymer obtained in Example 1.

DESCRIPTION OF EMBODIMENTS

Hereinbelow, an embodiment for implementing the present invention will be described in detail. Note that the present invention is not intended to be limited to the embodiment described below.

<1. Chloroprene-Based Polymer>

A chloroprene-based polymer of the present embodiment is mainly based on 2-chloro-1,3-butadiene (hereinbelow, referred to as "chloroprene") and has a functional group of a structure represented by the general formula (1) or (2) below.

[Chemical Formula 5]

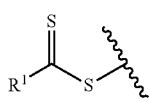

(1)

[Chemical Formula 6]

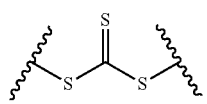

(2)

In the general formula (1), $R^1$ shows hydrogen, chlorine, a substituted or unsubstituted alkyl group, a substituted or unsubstituted alkenyl group, a substituted or unsubstituted aryl group, or a substituted or unsubstituted heterocyclyl group.

The functional group of a structure represented by the above general formula (1) is introduced into a chloroprene-based polymer by performing radical polymerization in the presence of a chain transfer agent [CTA] represented by the general formula (3) below. The functional group of a structure represented by the above general formula (2) is introduced into a chloroprene-based polymer by performing radical polymerization in the presence of a chain transfer agent [CTA] represented by the general formula (4) below.

[Chemical Formula 7]

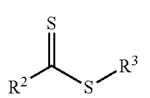

(3)

[Chemical Formula 8]

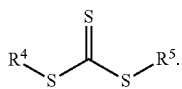

(4)

In the general formula (3), $R^2$ shows hydrogen, chlorine, a substituted or unsubstituted alkyl group, a substituted or unsubstituted alkenyl group, a substituted or unsubstituted aryl group, or a substituted or unsubstituted heterocyclyl group. In the general formulas (3) and (4), $R^3$ to $^5$ each independently show a substituted or unsubstituted alkyl group, a substituted or unsubstituted and saturated or unsaturated aromatic carbocycle, a substituted or unsubstituted and saturated or unsaturated aromatic heterocycle, an organometallic species, or any polymer chain.

The chain transfer agent [CTA] represented by the above general formula (3) is not particularly limited, a common compound can be used, and examples thereof include dithiocarbamates and dithioesters. Specific examples include benzyl 1-pyrrolecarbodithioate (trivial name: benzyl 1-pyrroledithiocarbamate), 1-benzyl-N,N-dimethyl-4-aminodithiobenzoate, 1-benzyl-4-methoxydithiobenzoate, 1-phenylethyl imidazole carbodithioate (trivial name: 1-phenylethyl imidazoledithiocarbamate), benzyl-1-(2-pyrrolidinone)carbodithioate (trivial name: benzyl-1-(2-pyrrolidinone)dithiocarbamate), benzyl phthalimidyl carbodithioate, (trivial name: benzyl phthalimidyl dithiocarbamate), 2-cyanoprop-2-yl-1-pyrrolecarbodithioate, (trivial name: 2-cyanoprop-2-yl-1-pyrroledithiocarbamate), 2-cyanobut-2-yl-1-pyrrole-carbodithioate (trivial name: 2-cyanobut-2-yl-1-pyrroledithiocarbamate), benzyl-1-imidazole carbodithioate (trivial name: benzyl-1-imidazoledithiocarbamate), 2-cyanoprop-2-yl-N,N-dimethyldithiocarbamate, benzyl-N,N-diethyldithiocarbamate, cyanomethyl-1-(2-pyrrolidone)dithiocarbamate, 2-(ethoxycarbonylbenzyl)prop-2-yl-N,N-diethyldithiocarbamate, benzyldithioate, 1-phenylethyl dithiobenzoate, 2-phenylprop-2-yldithiobenzoate, 1-acetic acid-1-yl-ethyldithiobenzoate, 1-(4-methoxyphenyl)ethyldithiobenzoate, benzyldithioacetate, ethoxycarbonylmethyl dithioacetate, 2-(ethoxycarbonyl)prop-2-yldithiobenzoate, 2-cyanoprop-2-yldithiobenzoate, dithiobenzoate, tert-butyldithiobenzoate, 2,4,4-trimethylpent-2-yldithiobenzoate, 2-(4-chlorophenyl)-prop-2-yldithiobenzoate, 3-vinylbenzyldithiobenzoate, 4-vinylbenzyldithiobenzoate, benzyldiethoxyphosphinyl dithioformate, tert-butyl trithioperbenzoate, 2-phenylprop-2-yl-4-chlorodithiobenzoate, naphthalene-1-carboxylic acid-1-methyl-1-phenyl-ethyl-ester, 4-cyano-4-methyl-4-thiobenzyl sulfanyl butyric acid, dibenzyl tetrathioterephthalate, carboxymethyl dithiobenzoate, poly(ethylene oxide) comprising a dithiobenzoate terminal group, poly(ethylene oxide) comprising a 4-cyano-4-methyl-4-thiobenzyl sulfanyl butyric acid terminal group, 2-[(2-phenylethanethioyl)sulfanyl]propionic acid, 2-[(2-phenylethanethioyl)sulfanyl]succinic acid, 3,5-dimethyl-1H-pyrazole-1-carbodithioate potassium, cyanomethyl-3,5-dimethyl-1H-pyrazole-1-carbodithioate, cyanomethylmethyl-(phenyl)dithiocarbamate, benzyl-4-chlorodithiobenzoate, phenylmethyl-4-chlorodithiobenzoate, 4-nitrobenzyl-4-chlorodithiobenzoate, phenylprop-2-yl-4-chlorodithiobenzoate, I-cyano-1-methylethyl-4-chlorodithiobenzoate, 3-chloro-2-butenyl-4-chlorodithiobenzoate, 2-chloro-2-butenyl dithiobenzoate, benzyl dithioacetate, 3-chloro-2-butenyl-1H-pyrrole-1-dithiocarboxylic acid, 2-cyanobutan-2-yl 4-chloro-3,5-dimethyl-1H-pyrazole-1-carbodithioate, and cyanomethylmethyl(phenyl)carbamodithioate. Among these, benzyl 1-pyrrolecarbodithioate, 1-phenylethyl imidazole carbodithioate, 3-chloro-2-butenylpyrroledithiocarbamate, 1H-pyrrole-1-carbodithioic acid-phenylenebismethylene ester or benzyldithiobenzoate is more preferred, and benzyl 1-pyrrolecarbodithioate is particularly preferably used.

The chain transfer agent [CTA] represented by the above general formula (4) is not particularly limited, a common compound can be used, and examples thereof include trithiocarbonates such as 2-cyano-2-propyldodecyltrithiocarbonate, dibenzyltrithiocarbonate, butylbenzyltrithiocarbonate, 2-[[(butylthio)thioxomethyl]thio]propionic acid, 2-[[(dodecylthio)thioxomethyl]thio]propionic acid, 2-[[(butylthio)thioxomethyl]thio]succinic acid, 2-[[(dodecylthio)thioxomethyl]thio]succinic acid, 2-[[(dodecylthio)thioxomethyl]thio]-2-methylpropionic acid, 2,2'-[carbonothioylbis(thio)]bis[2-methylpropionic acid], 2-amino-1-methyl-2-oxoethylbutyltrithiocarbonate, benzyl 2-[(2-hydroxyethyl)amino]-1-methyl-2-oxoethyltrithiocarbonate, 3-[[[(tert-butyl)thio]thioxomethyl]thio]propionic acid, cyanomethyldodecyltrithiocarbonate, diethylaminobenzyltrithiocarbonate, and dibutylaminobenzyltrithiocarbonate. Among these, dibenzyltrithiocarbonate or butylbenzyltrithiocarbonate is particularly preferably used.

For the above general formula (1), a structure represented by the general formula (5) below is preferred.

[Chemical Formula 9]

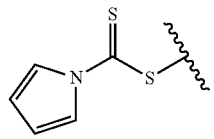

(5)

The functional group of a structure represented by the above general formula (5) can be introduced into a chloroprene-based polymer by performing radical polymerization in the presence of benzyl 1-pyrrolecarbodithioate (trivial name: benzyl pyrroledithiocarbamate).

Introduction of a portion of the structure of the chain transfer agent used, as a functional group, into the polymer is obvious from a literature concerning common RAFT polymerization (Aust. J. Chem. 2009, 62, 1402-1472). Additionally, the presence of the above functional group in the chloroprene-based polymer can be confirmed by any method, but a 13C-NMR method is generally used. Peaks derived from the functional group can be observed by performing measurement in a sufficient cumulative number. Further, those skilled in the art can confirm the presence of the above functional group by performing similar measurement on the obtained polymer using a 13C-enriched chain transfer agent [CTA] represented by the general formula (3) or (4).

The number average molecular weight Mn of the chloroprene-based polymer of the present embodiment is 150000 to 300000. A chloroprene-based polymer having a number average molecular weight Mn of less than 150000 may not develop dynamic physical properties as an industrially feasible vulcanized rubber. Alternatively, from a chloroprene-based polymer having a number average molecular weight Mn of more than 300000, a vulcanized rubber may not be synthesized. Moreover, the dynamic physical properties as an adhesive, for example, adhesive peel strength of a chloroprene-based polymer having a number average molecular weight Mn of less than 150000 may be low.

In the chloroprene-based polymer of the present embodiment, the molecular weight distribution Mw/Mn, which is a ratio of the weight average molecular weight Mw to the above number average molecular weight Mn, is preferably 1.5 to 5.0, more preferably 2.0 to 5.0. A molecular weight distribution Mw/Mn of 1.5 or more is suitable for industrial applications. In contrast, adjusting the molecular weight distribution Mw/Mn to more than 5.0 is technically difficult.

The weight average molecular weight Mw and the number average molecular weight Mn are values measured by gel permeation chromatography (GPC), and details of the measurement conditions are as described in the section of Examples mentioned below.

The chloroprene-based polymer of the present embodiment is a chloroprene homopolymer, or a statistical copolymer consisting of a chloroprene monomer and a monomer copolymerizable with the chloroprene monomer.

Examples of the monomer copolymerizable with the chloroprene monomer include acrylic acid, methacrylic acid, acrylates such as methyl acrylate, butyl acrylate, and 2-ethylhexyl acrylate, methacrylic acid, methacrylates such as methyl methacrylate, butyl methacrylate, and 2-ethylhexyl methacrylate, hydroxy (meth)acrylates such as 2-hydroxyethyl (meth)acrylate, 2-hydroxymethyl (meth)acrylate, and 2-hydroxypropyl (meth)acrylate, 2,3-dichloro-1,3-butadiene, 1-chloro-1,3-butadiene, butadiene, isoprene, ethylene, aromatic vinyl compounds such as styrene, unsaturated nitriles such as acrylonitrile and methacrylonitrile, and acrylamide. Among these, at least one selected from the group consisting of 2,3-dichloro-1,3-butadiene, 1-chloro-1,3-butadiene, acrylic acid, an acrylate, methacrylic acid, a methacrylate, acrylamide, an unsaturated nitrile, and an aromatic vinyl compound is preferred.

In the present description, copolymerization is "statistical copolymerization", and a "statistical copolymer" refers to a copolymer comprising a sequence of statistical monomer units obtained by statistical copolymerization. That is, a "statistical copolymer" means a copolymer of which monomer sequence distribution can be described by means of the Bernoulli statistical model or by means of the primary or secondary Markov statistical model as described in J. C. Randall "POLYMER SEQUENCE DETERMINATION, Carbon-13 NMR Method" Academic Press, New York, 1977, pages 71-78. In the case where the "statistical copolymer" in the chloroprene-based polymer of the present embodiment is constituted by a monomer of a binary system, in the Mayo-Lewis expression (I) below, with respect to reactivity ratios r1 and r2 when d[M1]/d[M2] is the ratio of a chloroprene monomer to monomers other than the chloroprene monomer at the start of the polymerization and M1 is the chloroprene monomer, r1 ranging from 0.3 to 3000 and r2 ranging from $10^{-5}$ to 3.0 are preferred for obtaining a statistical copolymer. From even another viewpoint, in the present description, the "statistical copolymer" is a copolymer obtained by radical polymerization in the coexistence of a plurality of monomers. The above "statistical copolymer" is a concept encompassing a substantially random copolymer.

[Expression 1]

$$\frac{d[M1]}{d[M2]} = \frac{[M1]}{[M2]} \times \frac{r_1[M1]+[M2]}{[M1]+r_2[M2]} \quad (I)$$

The chloroprene-based polymer of the present embodiment can be produced by the following method. That is, a solution (A) in which a chain transfer agent [CTA] represented by the above general formula (3) or (4) is added to 100 parts by mass of a total monomer to achieve a ratio of the amount of substance of the total monomer to that of the chain transfer agent $[M]_0/[CTA]$ at the start of polymerization of 5/1 to 500/1 and 500 to 5000 parts by mass of an aqueous solution (B) of 0.1 to 10% by mass of an emulsifier are mixed and emulsified, then, radical polymerization is performed, and 100 to 5000 parts by mass of a chloroprene monomer singly or of a chloroprene monomer and a monomer copolymerizable with the chloroprene monomer is/are additionally added when the polymerization ratio reaches 20 to 50%. The monomer to be additionally added is preferably 250 to 3000 parts by mass.

It is possible to enhance the polymerization controllability when the molecular weight is increased by adjusting the amount of substance of the total monomer $[M]_0$ to the amount of substance of the chain transfer agent [CTA] at the start of the polymerization so as to achieve the ratio $[M]_0/[CTA]=5/1$ to 500/1. When the monomer ratio is less than 5/1, the chain transfer agent is separated when an emulsion is produced, and thus the molecular weight distribution cannot be controlled, and when the monomer ratio is more than 500/1, the chloroprene is subjected to free radical polymerization due to heat polymerization, and thus a sufficient living property cannot be obtained. The value of $[M]_0/[CTA]$ is preferably 100/1 to 300/1.

When the polymerization ratio of the monomer initially added has reached 20 to 50%, the monomer is additionally added in accordance with on a desired molecular weight. In the case of 20% or less, free radical polymerization may proceed due to formation of new micelles during polymerization, and in the case of 50% or more, monomer oil droplets disappear once, thus continuous monomer supply is interrupted, and a side reaction may proceed.

The polymerization ratio of the monomer initially added can be determined from the specific gravity of the emulsion. That is, it is possible to make a calibration curve between the polymerization ratio and the specific gravity by polymerizing the monomer under the same conditions in advance, sampling at three or more points, and measuring the solid concentration and the specific gravity.

In order to achieve a molecular weight of 150000 to 300000, it is also possible to determine the ratio of the amount of substance of the total monomer to the chain transfer agent and the polymerization ratio based on the theoretical molecular weight to be calculated by the expression (II) below.

$$(\text{Theoretical molecular weight}) = MW(M) \times [M]_T / [CTA] \times \text{polymerization ratio} + MW(CTA) \quad (II)$$

MW (M): Average molecular weight of the monomers (molecular weight of monomer 1×molar fraction+molecular weight of monomer 2×molar fraction of monomer)

$[M]_T$: Amount of substance of the total monomers

[CTA]: Amount of substance of the chain transfer agent

MW (CTA): Molecular weight of the chain transfer agent

With respect to a method for additionally adding a monomer, it is preferred to cool the monomer in order to prevent heat polymerization of the monomer. The mean for additional addition is not particularly limited, and it should be added directly into the system using a pump or the like.

In order to introduce at least one functional group shown in the above general formula (I) into the molecule, a known RAFT agent should be used as the chain transfer agent. The RAFT agent is preferably a compound shown in the above general formula (3), and is more preferably benzyl 1-pyrrolecarbodithioate (may be described as the trivial name "benzyl pyrroledithiocarbamate"), 1-phenylethyl imidazole carbodithioate, 3-chloro-2-butenyl pyrroledithiocarbamate, 1H-pyrrole-1-carbodithioic acid-phenylenebismethylene ester, or benzyldithiobenzoate. Benzyl 1-pyrrolecarbodithioate (trivial name: benzyl pyrroledithiocarbamate) is further preferred. These RAFT agents are described in Japanese Unexamined Patent Application Publication (Translation of PCT Application) Nos. 2000-515181 and 2002-508409.

In order to introduce at least one functional group shown in the above general formula (2) into the molecular, a compound shown in the above general formula (4) should be used as the chain transfer agent. Specific examples thereof include butylbenzyltrithiocarbonate, dibenzyltrithiocarbonate, and 2-cyano-2-propyldodecyltrithiocarbonate. Among these, butylbenzyltrithiocarbonate or dibenzyltrithiocarbonate is preferred.

The radical polymerization initiator is not particularly limited, and a persulfate, sodium persulfate, hydrogen peroxide, t-butyl hydroperoxide, or an azo-based compound can be used, but it is preferred that the 10-hour half-life temperature is 70° C. or less. When the initiator 10-hour half-life temperature is 70° C. or less, it is possible to further enhance the polymerization controllability by generating sufficient radicals in the initial stage of the polymerization.

The emulsifier to be used in emulsion polymerization is not particularly limited, but from the viewpoint of emulsification stability, an anionic or nonionic emulsifier is preferred. Especially, for the reason that it is possible to prevent excessive contraction and breakage by allowing a film-like chloroprene-based polymer (chloroprene rubber) obtained by freeze coagulation and drying after finish of the polymerization to have moderate strength, it is preferred to use an alkali metal rosinate. A rosin acid is a mixture of a resin acid, a fatty acid, and the like. As the resin acid, abietic acid, neoabietic acid, palustric acid, pimaric acid, isopimaric acid, dehydroabietic acid, dihydropimaric acid, dihydroisopimaric acid, secodehydroabietic acid, dihydroabietic acid or the like is contained, and as the fatty acid, oleic acid, linoleic acid or the like is contained. The composition of these components, which varies depending on difference in collection methods of rosins, which are classified into gum rosins, wood rosins, and tall rosins, the production area and type of pines, distillation purification, and disproportionation reaction, is not limited in the present invention. Considering the emulsification stability and ease of handling, the emulsifier is preferably sodium rosinate or potassium rosinate.

The concentration of the emulsifier is 0.1 to 10% by mass, more preferably 1 to 5% by mass. When the concentration is lower than 0.1% by mass, it is not possible to sufficiently emulsify the monomer, and when it exceeds 10% by mass, the chloroprene-based polymer may not be precipitated successfully when solidified.

The amount of the aqueous solution (B) of 0.1 to 10% by mass of an emulsifier to be added is 500 to 5000 parts by mass, more preferably 600 to 4000 parts by mass with respect to 100 parts by mass of the total monomers at the start of polymerization. It is preferred that the amount of the aqueous solution (B) to be added is set to 100 to 200 parts by mass with respect to 100 parts by mass of the total monomers including the monomer to be additionally added, considering the stability of the final latex.

It is preferred that the polymerization temperature is 10 to 50° C. It is possible to further enhance the viscosity of the emulsion and the efficiency of the initiator by setting the polymerization temperature to 10° C. or more. In addition, the boiling point of chloroprene is about 59° C., and thus, by setting the polymerization temperature to 50° C. or less, it is possible to avoid a situation in which the reaction liquid bumps due to delayed heat removal even when heat is generated due to abnormal polymerization or the like. Also for the living property, there is the advantage of not requiring to consider the influence from hydrolysis of the chain transfer agent and evaporation of the monomer when it is set to 50° C. or less.

The final polymerization ratio of the total monomers after additional addition of the monomer is preferably 95% or less from the viewpoint of prevention of a side reaction, and is more preferably 85% or less from the viewpoint of further enhancing the durability and fatigue endurance. The final polymerization ratio of the total monomers after additional addition of the monomer is preferably 50% or more from the viewpoint of increasing the molecular weight to obtain sufficient dynamic physical properties as a vulcanized rubber. Also, the final polymerization ratio is further preferably 50 to 75% from the viewpoint of the productivity.

In order to adjust the final polymerization ratio of the total monomers after additional addition of the monomer, polymerization should be terminated by adding a polymerization inhibitor for terminating the polymerization reaction when a desired polymerization ratio is reached.

As the polymerization inhibitor, an inhibitor usually used can be used, and there is no particular limitation thereto, but examples thereof include thiodiphenylamine, 4-tertiary butylcatechol, and 2,2-methylenebis-4-methyl-6-tertiary butyl phenol which are oil-soluble polymerization inhibitors, and diethylhydroxylamine which is a water-soluble polymerization inhibitor.

An unreacted monomer should be removed by a steam stripping method, for example. Thereafter, the pH is adjusted, and steps of a general freeze coagulation, washing with water, hot air drying and the like are performed to thereby obtain a chloroprene rubber.

It is possible to industrially advantageously produce a chloroprene-based polymer of a high molecular weight and capable of exhibiting excellent vulcanized rubber physical properties and high adhesive peel strength, by means of the emulsion polymerization method of the present embodiment as described above, in which a radical polymerization initiator and a specific chain transfer agent are used.

<2. Latex>

The latex of the present embodiment comprises the above chloroprene-based polymer, and is preferably for an adhesive or for a vulcanized rubber. The details of the adhesive and the vulcanized rubber are described below.

<3. Composition>

The composition of the present embodiment comprises the above chloroprene-based polymer, and is preferably an adhesive composition or a rubber composition.

It is preferred that the adhesive composition of the present embodiment is a solvent-based adhesive composition. The solvent-based adhesive composition can comprise a solvent in addition to the above chloroprene-based polymer. It is preferred that, the solvent is not an aromatic solvent such as toluene, xylene, or ethylbenzene, which is a causative agent of sick house syndrome, but is a non-aromatic solvent such as n-hexane, cyclohexane, methylcyclohexane, acetone, methyl ethyl ketone, ethyl acetate, or butyl acetate, and that the above chloroprene-based polymer is dissolved only with a mixture of poor solvents, which solvents each are singly poor in solubility of the chloroprene rubber.

The amount of the solvent to be used may be appropriately adjusted depending on the application and type of the adhesive, it is not particularly limited, and adjusting the solid concentration of the chloroprene rubber to 10 to 30% by mass is preferred because the balance between the heat resistant adhesiveness and the initial adhesiveness as an adhesive becomes good.

The adhesive composition may comprise a metal oxide, a tackifying resin, and an antidegradant, in addition to the solvent. It is possible to enhance the initial adhesive strength, normal adhesive strength, by adding these additives to the adhesive, spray coating property, and the like of the obtained adhesive.

As the metal oxide, for example, it is possible to use zinc oxide (zinc flower), aluminum oxide, titanium oxide, magnesium oxide, or the like. As the tackifying resin, for example, it is possible to use a phenolic resin, a rosin resin, a coumarone resin, a petroleum resin, or the like. As the antidegradant, for example, it is possible to use 2,2'-methylenebis(4-ethyl-6-t-butylphenol), 2,2'-methylenebis(4-methyl-6-t-butylphenol), 2,6-di-t-butyl-4-methylphenol, pentaerythritol tetrakis[3-(3,5-di-t-butyl-4-hydroxyphenyl)propionate], thiodiethylenebis[3-(3,5-di-t-butyl-4-hydroxyphenyl)propionate], octadecyl-3-(3,5-di-t-butyl-4-hydroxyphenyl)propionate, N,N'-hexane-1,6-diylbis-3-(3,5-di-t-butyl-4-hydroxyphenylpropionamid e), 3,5-bis(1,1-dimethylethyl)-4-hydroxyalkyl ester, diethyl[{3,5-bis(1,1-dimethylethyl)-4-hydroxyphenyl}methyl]phosphon ate, 3,3',3'',5,5',5''-hexa-t-butyl-a,a',a''-(mesitylene-2,4,6-triyl)tri-p-cresol, ethylenebis(oxyethylene)bis[3-(5-t-butyl-4-hydroxy-m-tolyl)propionate], tetraethylthiuram disulfide, tetrabutylthiuram disulfide, tetramethylthiuram monosulfide, or the like.

Furthermore, the adhesive composition may comprise a formaldehyde catcher, a filler, and the like depending on desired physical properties.

As the formaldehyde catcher, for example, it is possible to use pyrrolidine, piperidine, piperazine, morpholine, melamine, dicyandiamide, urea, ethyleneurea, 4,5-dimethoxyethyleneurea, propyleneurea, 5-methylpropyleneurea, 5-hydroxypropyleneurea, 5-methoxypropyleneurea, oxalylurea (parabanic acid), hydrazobenzothiazole, semicarbazide, or thiosemicarbazide. The formaldehyde catcher can capture formaldehyde, which is a deleterious volatile substance. As the filler, it is possible to use talc, calcium carbonate, clay, smectite, silica, hydrotalcite, mica, or the like.

In order to enhance light resistance, an ultraviolet absorber such as benzotriazole and a light stabilizer such as hindered amine may also be added to the adhesive composition.

Additionally, the adhesive composition of the present embodiment may comprise at least one raw rubber (uncrosslinked or unvulcanized rubber) selected from the group consisting of a natural rubber, an isoprene rubber, a butyl rubber, a nitrile rubber, a hydrogenated nitrile rubber, a butadiene rubber, a styrene butadiene rubber, and an ethylene propylene rubber.

As a method for producing an adhesive composition, generally known is a method in which an alkylphenol resin and magnesium oxide (MgO) are dissolved in an organic solvent and left to stand at 25° C. for 20 hours, and then, a mixture obtained by kneading chloroprene rubber, a metal oxide, an antidegradant, and the like using a roll is dissolved. However, it is not necessary to knead the above chloroprene-based polymer with a metal oxide, an antidegradant and the like by a roll, and the polymer can also be dissolved and dispersed directly in an organic solvent to produce an adhesive composition. The production means is not particularly limited, and a known machine or apparatus may be used.

The adhesive composition of the present embodiment is used as a raw material for an adhesive. For example, an adhesive may be obtained by further adding another additive to the above adhesive composition or mixing the above adhesive composition with another adhesive composition. The adhesive can be suitably used for bonding and adhesion of the same or different types, such as paper, wood, fabric, leather, jersey, leather, rubber, plastic, foam, pottery, glass, mortar, cement-based material, ceramic, metal, and the like.

The adhesive composition of the present embodiment or an adhesive in which the composition is used has high stability, and has the layer separation resistance of 8 weeks or more.

A rubber composition comprising the above chloroprene-based polymer is used in production of a crosslinked rubber or vulcanized rubber by being crosslinked or vulcanized. The rubber composition of the present embodiment is suitably used in production of a vulcanized rubber.

In the rubber composition of the present embodiment, raw materials other than the chloroprene-based polymer are not particularly limited and can be appropriately selected depending on the purpose or applications. Examples of the raw materials that may be contained in the rubber composition include a vulcanizing agent, a vulcanization accelerator, a filler or a reinforcing agent, a plasticizer, a processing aid and a lubricant, an antidegradant, and a silane coupling agent.

As a vulcanizing agent that can be added, sulfur, thiourea-based, guanidine-based, thiuram-based, and thiazole-based organic vulcanizing agents, which are generally used for vulcanizing a chloroprene rubber, can be used, but thiourea-based ones are preferred. Examples of the thiourea-based vulcanizing agent include ethylenethiourea, diethylthiourea, trimethylthiourea, triethylthiourea, and N,N'-diphenylthiourea, and trimethylthiourea and ethylenethiourea are particularly preferred. Vulcanizing agents such as a mixture of 3-methylthiazolidinethione-2-thiazole and phenylenedimaleimide, dimethylammonium hydrogen isophthalate, or 1,2-dimercapto-1,3,4-thiadiazole derivatives can also be used. As for these vulcanizing agents, two or more of the vulcanizing agents described above may be used in combination. It is also possible to use a metal simple substance such as beryllium, magnesium, zinc, calcium, barium, germanium, titanium, tin, zirconium, antimony, vanadium, bismuth, molybdenum, tungsten, tellurium, selenium, iron, nickel, cobalt, and osmium, and an oxide or hydroxide of these metals, as the vulcanizing agent. Among these vulcanizing agents that can be added, calcium oxide, zinc oxide, antimony dioxide, antimony trioxide, and magnesium oxide, of which vulcanizing effect is high, are particularly preferred. Additionally, two or more of these vulcanizing agents may be used in combination. Note that it is preferred that the vulcanizing agent is added in the range of 0.1 parts by mass or more and 10 parts by mass or less in total with respect to 100 parts by mass of the rubber component in the rubber composition of the present embodiment.

A filler or a reinforcing agent, which is added for adjusting the hardness of the rubber or for enhancing the mechanical strength thereof, is not particularly limited, but examples thereof include carbon black, silica, clay, talc, and calcium carbonate. As other inorganic fillers, which are not particularly limited, aluminas ($Al_2O_3$) such as γ-alumina and α-alumina, alumina monohydrates ($Al_2O_3H_2O$) such as boehmite and diaspore, aluminum hydroxides [$Al(OH)_3$] such as gibbsite and bayerite, aluminum carbonate [$Al_2(CO_3)_2$], magnesium hydroxide [$Mg(OH)_2$], magnesium carbonate ($MgCO_3$), talc ($3MgO.4SiO_2.H_2O$), attapulgite ($5MgO \cdot 8SiO_2 \cdot 9H_2O$), titanium white ($TiO_2$), titanium black ($TiO_{2n-1}$), calcium oxide (CaO), calcium hydroxide [Ca(OH)$_2$], aluminum magnesium oxide ($MgO \cdot Al_2O_3$), clay ($Al_2O_3 \cdot 2SiO_2$), kaolin ($Al_2O_3 \cdot 2SiO_2 \cdot 2H_2O$), pyrophillite ($Al_2O_3 \cdot 4SiO_2 H_2O$), bentonite ($Al_2O_3 \cdot 4SiO_2 \cdot 2H_2O$), aluminum silicate (such as $Al_2SiO_5$ or $Al_4 \cdot 3SiO_4 \cdot 5H_2O$), magnesium silicate (such as $Mg_2SiO_4$ or $MgSiO_3$), calcium silicate (such as $Ca_2SiO_4$), aluminum calcium silicate (such as $Al_2O_3 \cdot CaO \cdot 2SiO_2$), magnesium calcium silicate ($CaMgSiO_4$), calcium carbonate ($CaCO_3$), zirconium Oxide ($ZrO_2$), zirconium hydroxide [$ZrO(OH)_2 \cdot nH_2O$], zirconium carbonate [$Zr(CO3)_2$], and crystalline alumino-silicates comprising hydrogen and an alkali metal or alkaline earth metal to correct electrical charges, such as various zeolites, may be used. As the filler and the reinforcing agent, one may be used singly or two or more may be used in combination. The amount of these filler and reinforcing agent to be used may be adjusted depending on physical properties required for a rubber composition or for a crosslinked rubber or vulcanized rubber obtained from the rubber composition, and is not particularly limited, but usually can be added in the range of 15 parts by mass or more and 200 parts by mass or less in total with respect to 100 parts by mass of the rubber component in the rubber composition of the present embodiment.

The plasticizer is not particularly limited as long as the plasticizer is compatible with the rubber, and examples thereof include vegetable oils such as rapeseed oil, linseed oil, castor oil, and coconut oil, and petroleum-based plasticizers such as phthalate-based plasticizers, DUP (diundecyl phthalate), DOS (dioctyl sebacate), DOA (dioctyl adipate), ester-based plasticizers, ether ester-based plasticizers, thioether-based plasticizers, aroma-based oils, naphthene-based oils, lubricants, process oils, paraffin, liquid paraffin, petrolatum, and petroleum asphalt, one plasticizer or a plurality of plasticizer can be used depending on properties required for a rubber composition or for a crosslinked rubber or vulcanized rubber obtained from the rubber composition. The amount of the plasticizer to be used is not particularly limited, and the plasticizer usually can be used in the range of 5 parts by mass or more and 50 parts by mass or less in total with respect to 100 parts by mass of the rubber component in the rubber composition of the present embodiment.

Examples of the processing aid and the lubricant, which are added in order to enhance processing characteristics and a surface slipping property so as to easily peel a rubber composition from a roll, a molding mold, a screw of an extrude, or the like on kneading or vulcanization-molding the rubber composition, include fatty acids such as stearic acid, paraffin-based processing aids such as polyethylene, and fatty acid amides. As the processing aid and the lubricant, one may be used singly or two or more may be used in combination. The amount thereof to be added is not particularly limited, but is usually 0.5 parts by mass or more and 5 parts by mass or less in total with respect to 100 parts by mass of the rubber component in the rubber composition of the present embodiment.

As the antidegradant for enhancing heat resistance, it is possible to add a primary antidegradant to capture radicals to thereby prevent autoxidation, and a secondary antidegradant to detoxify hydroperoxides, which are used in common rubber applications. Each of these antidegradants is preferably added at a ratio of 0.1 parts by mass or more and 10 parts by mass or less, more preferably in the range of 2 parts by mass or more and 5 parts by mass or less with respect to 100 parts by mass of the rubber component in the rubber composition. These antidegradants are not only used singly, and two or more of these may also be used in combination. Note that examples of the primary antidegradant can include phenol-based antidegradants, amine-based antidegradants, acrylate-based antidegradants, imidazole-based antidegradants, carbamate metal salts, and waxes, and examples of the secondary antidegradant can include phosphorus-based antidegradants, sulfur-based antidegradants, and imidazole-based antidegradants. Examples of the antidegradant include, but are not particularly limited to, N-phenyl-1-naphthylamine, alkylated diphenylamine, octylated diphenylamine, 4,4'-bis(α,α-dimethylbenzyl)diphenylamine, p-(p-toluenesulfonylamide)diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamin e, 1,1,3-tris-(2-methyl-4-hydroxy-5-tert-butylphenyl)butane, 4,4'-butylidenebis-(3-methyl-6-tert-butylphenol), 2,2-thiobis(4-methyl-6-tert-butylphenol), 7-octadecyl-3-(4'-hydroxy-3',5'-di-tert-butylphenyl)propionate, tetrakis-[methylene-3-(3',5'-di-tert-butyl-4'-hydroxyphenyl)propionate]methane, pentaerythritol-tetrakis[3-(3,5-di-tert-butyl-4-hydroxyphenyl)propionate], triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], 2,4-bis(n-octylthio)-6-(4-hydroxy-3,5-di-tert-butylanilino)-1,3,5-triazine, tris-(3,5-di-tert-butyl-4-hydroxybenzyl)-isocyanurate, 2,2-thio-diethylenebis[3-(3, 5-di-tert-butyl-4-hydroxyphenyl)propionate], N,N'-hexamethylenebis(3,5-di-tert-butyl-4-hydroxy)-hydrocinnamide, 2,4-bis[(octylthio)methyl]-o-cresol, 3,5-di-tert-butyl-4-hydroxybenzyl-phosphonate-diethylester, tetrakis[methylene(3,5-di-tert-butyl-4-hydroxyhydrocinnamate)]methan e, octadecyl-3-(3,5-di-tert-butyl-4-hydroxyphenyl)propionic acid ester and 3,9-bis[2-{3-(3-tert-butyl-4-hydroxy-5-methylphenyl)propionyloxy}-1,1-dimethylethyl]-2,4,8,10-tetraoxaspiro[5.5]undecane, tris(nonyl.phenyl)phosphite, tris(mixed mono- and di-nonylphenyl)phosphite, diphenyl.mono(2-ethylhexyl) phosphite, diphenyl.monotridecyl.phosphite, diphenyl.isodecyl.phosphite, diphenyl.isooctyl.phosphite, diphenyl.nonylphenyl.phosphite, triphenyl phosphite, tris(tridecyl) phosphite, triisodecyl phosphite, tris(2-ethylhexyl) phosphite, tris(2,4-di-tert-butylphenyl) phosphite, tetraphenyl-dipropylene glycol.diphosphite, tetraphenyl tetra(tridecyl) pentaerythritol tetraphosphite, 1,1,3-tris(2-methyl-4-ditridecyl phosphite-5-tert-butylphenyl)butane, 4,4'-butylidene bis(3-methyl-6-tert-butyl-di-tridecylphosphite), 2,2'-ethylidene bis(4,6-di-tert-butylphenol)fluorophosphite, 4,4'-isopropylidene-diphenolalkyl(C12 to C15)phosphite, cyclic neopentane tetraylbis(2,4-di-tert-butylphenylphosphite), cyclic neopentane tetraylbis(2,6-di-tert-butyl-4-phenylphosphite), cyclic neopentane tetraylbis(nonylphenylphosphite), bis(nonylphenyl)pentaerythritol diphosphite, dibutyl hydrogen phosphite, distearyl.pentaerythritol.diphosphite, and a hydrogenated bisphenol A.pentaerythritol phosphite.polymer.

In order to enhance the adhesion between the rubber component of the chloroprene-based polymer and the like and a filler and a reinforcing agent and to further enhance the mechanical strength, a silane coupling agent can be further added. The silane coupling agent may be added when the rubber composition is kneaded or by surface-treating the filler or the reinforcing agent in advance. Only one silane coupling agent may be used, or two or more silane coupling agents may be used in combination. Examples of the silane coupling agent include, but are not limited to, bis-(3-triethoxysilylpropyl)tetrasulfide, bis-(3-trimethoxysilylpropyl)tetrasulfide, bis-(3-methyldimethoxysilylpropyl)tetrasulfide, bis-(2-triethoxysilylethyl)tetrasulfide, bis-(3-triethoxysilylpropyl)disulfide, bis-(3-trimethoxysilylpropyl)disulfide, bis-(3-triethoxysilylpropyl)tri sulfide, 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, 2-lauroylthioethyltrimethoxysilane, 3-mercaptopropyltrimethoxysilane, 3-mercaptopropyltriethoxysilane, 3-mercaptopropylmethyldimethoxysilane, 3-aminopropyltrimethoxysilane, 3-aminopropyltriethoxysilane, γ-glycidoxypropyltrimethoxysilane, γ-glycidoxypropylmethyldiethoxysilane, 3-trimethoxysilylpropyl-N,N-dimethylthiocarbamoyl tetrasulfide, 3-trimethoxysilylpropylbenzothiazolyl tetrasulfide, 3-trimethoxysilylpropylmethacryloyl monosulfide, methyltrimethoxysilane, methyltriethoxysilane, dimethyldiethoxysilane, dimethyldimethoxysilane, trimethylethoxysilane, trimethylmethoxysilane, isobutyltrimethoxysilane, n-decyltrimethoxysilane, phenyltrimethoxysilane, phenyltriethoxysilane, diphenyldimethoxysilane, diphenyldiethoxysilane, hexyltrimethoxysilane, octadecylmethyldimethoxysilane, octadecyltrimethoxysilane, methyltrichlorosilane, dimethyldichlorosilane, triphenylchlorosilane, heptadecafluorodecylmethyldichlorosilane, heptadecafluorodecyltrichlorosilane, and triethylchlorosilane.

The rubber composition of the present embodiment may additionally comprise at least one raw rubber (uncrosslinked or unvulcanized rubber) selected from the group consisting of a natural rubber, an isoprene rubber, a butyl rubber, a nitrile rubber, a hydrogenated nitrile rubber, a butadiene rubber, a styrene butadiene rubber, and an ethylene propylene rubber. It is preferred that the rubber composition of the present embodiment is vulcanized to practically use as a vulcanized rubber. For vulcanization, a known method can be used, but it is general to perform using a thiourea-based vulcanizing agent at a vulcanization temperature of 120 to 230° C.

A vulcanized rubber obtained by vulcanizing the above composition can exhibit high dynamic properties of a tensile strength of 20 MPa and an elongation at break of 350% or more in a tensile test based on JIS K 6251.

The vulcanized rubber obtained by vulcanizing the above rubber composition exhibits high durability and fatigue endurance. Specifically, it exhibits a flex fatigue property in that no cracking occurs even when a Demattia flex fatigue test based on JIS K 6260 is repeated 1000000 times. The details of the measurement conditions of the Demattia flex fatigue test are as described in the section of Examples mentioned below.

The vulcanized rubber obtained by vulcanizing the above rubber composition has excellent durability and fatigue endurance, and thus, can dramatically extend the life of products, and therefore, is useful in various products. The above vulcanized rubber is suitably used particularly in an antivibration rubber, a belt, a component for an overhead vehicle, an antiseismic rubber, a hose, a wiper, an immersion product, a seal component, boots, a rubberized cloth, a rubber roll, or a sponge product.

A method for producing a product comprising the above rubber composition is not particularly limited as long as the above rubber composition is used in the product. The rubber composition may be used as is or may be used after sufficiently vulcanized.

EXAMPLES

Hereinbelow, the present invention will be described in more details with reference to Examples and Comparative Examples, but the present invention is not intended to be limited to these Examples.

Example 1

To a polymerization can of an inner volume of 10 liters, 480 g of a chloroprene monomer, 5.2 g of benzyl 1-pyrrolecarbodithioate (trivial name: benzyl pyrroledithiocarbamate), 4000 g of pure water, 160 g of disproportionated potassium rosinate (manufactured by Harima Chemicals Group, Inc.), 9.2 g of sodium hydroxide, and 20 g of a sodium salt of a condensation product of β-naphthalenesulfonic acid and formalin (trade name: DEMOL N: manufactured by Kao Corporation) were added. 0.60 g of potassium peroxide was added as a polymerization initiator, and polymerization was performed at a polymerization temperature of 35° C. under a nitrogen gas flow. 3520 g of a chloroprene monomer was additionally added over 2 hours when the polymerization ratio of the initial monomer reached 30%, and diethylhydroxyamine (0.02 parts by mass with respect to 100 parts by mass of the chloroprene monomer used) was added as a polymerization terminator to terminate the polymerization when the final polymerization ratio reached 70%. After removal of the unreacted monomer by distillation under reduced pressure, the pH of a chloroprene latex containing the chloroprene-based polymer was adjusted to 7.0 using dilute acetic acid. Then, a solid chloroprene-based polymer (chloroprene rubber) was obtained by means of a freeze coagulation and drying method. In the freeze coagulation and drying method, specifically, the latex was poured onto a metal plate cooled to −20° C. and demulsified by freeze coagulation, and the obtained sheet was washed with water and then dried at 130° C. for 15 minutes to thereby obtain a solid chloroprene-based polymer.

[Measurement of Molecular Weight]

The number average molecular weight Mn, the mass average molecular weight Mw, and the molecular weight distribution (Mw/Mn) of the obtained chloroprene-based polymer and a polymer or copolymer obtained in the midway sampling were, after the sample adjustment concentration was set to 0.1% by mass using THF, measured by TOSOH HLC-8320GPC (in terms of standard polystyrene). At this time, using a TSK guard column HHR-H as a precolumn and three HSKgelGMHHR-H as analysis columns, it was allowed to flow out at a sample pump pressure of 8.0 to 9.5 MPa, a flow rate of 1 mL/min, and 40° C. and detected with a differential refractometer. For the efflux time and the molecular weight, used was a calibration curve produced by measuring a total of 9 standard polystyrene samples of which molecular weight was known as mentioned below: (Mw=8.42×10$^6$, 1.09×10$^6$, 7.06×10$^5$, 4.27×10$^5$, 1.90×10$^5$, 9.64×10$^4$, 3.79×10$^4$, 1.74×10$^4$, 2.63×10$^3$).

[Analysis on Functional Group Derived from Chain Transfer Agent [CTA] by Means of 1H-NMR Measurement]

Analysis on the functional group derived from the chain transfer agent [CTA] of the obtained chloroprene-based polymer was performed as follows. The obtained chloroprene-based polymer was purified with benzene and methanol and freeze-dried again to obtain a specimen for measurement. 30 mg of the chloroprene-based polymer was dissolved in 1 ml of deuteriochloroform, and 1H-NMR measurement was performed using ECX400 (400 MHz) manufactured by JEOL at 30° C. The 1H-NMR spectrum of the chloroprene-based polymer obtained in Example 1 is shown in FIG. 1. Peaks derived from the chain transfer agent [CTA] (benzyl 1-pyrrolecarbodithioate) used (peaks denoted as a and b in FIG. 1) were clearly observed. The structure of the identified functional group was shown in the table below.

Example 2

A chloroprene rubber of Example 2 was obtained in the same manner as in Example 1 except that benzyl 1-pyrrolecarbodithioate (trivial name: benzyl pyrroledithiocarbamate) of Example 1 was changed to 5.0 g and potassium persulfate was changed to 0.58 g.

Example 3

A chloroprene rubber of Example 3 was obtained in the same manner as in Example 1 except that benzyl 1-pyrrolecarbodithioate (trivial name: benzyl pyrroledithiocarbamate) of Example 1 was changed to 3.2 g, potassium persulfate was changed to 0.37 g, and the final polymerization ratio was set to 80%.

Example 4

A chloroprene rubber of Example 4 was obtained in the same manner as in Example 1 except that 5.52 g of butylbenzyltrithiocarbonate was added instead of benzyl 1-pyrrolecarbodithioate (trivial name: benzyl pyrroledithiocarbamate) of Example 1, and potassium persulfate was changed to 0.64 g.

Example 5

A chloroprene rubber of Example 5 was obtained in the same manner as in Example 1 except that 6 g of dibenzyltrithiocarbonate was added instead of benzyl 1-pyrrolecarbodithioate (trivial name: benzyl pyrroledithiocarbamate) of Example 1, and potassium persulfate was changed to 0.69 g.

Example 6

A chloroprene rubber of Example 6 was obtained in the same manner as in Example 1 except that the chloroprene monomer in the initial stage of Example 1 was set to 400 g, the chloroprene monomer to be additionally added was set to 3600 g, and the final polymerization ratio was changed to 65%.

Example 7

A chloroprene rubber of Example 7 was obtained in the same manner as in Example 1 except that the final polymerization ratio of Example 1 was changed to 95%.

Example 8

A chloroprene rubber of Example 8 was obtained in the same manner as in Example 1 except that the monomers to be fed in the initial stage of Example 1 were set to 380 g of the chloroprene monomer and 200 g of 2,3-dichloro-1,3-butadiene monomer, the monomer to be additionally added was set to 3400 g of the chloroprene monomer, benzyl 1-pyrrolecarbodithioate (trivial name: benzyl pyrroledithiocarbamate) was set to 4.8 g, potassium persulfate was set to 0.56 g, and the final polymerization ratio was changed to 65%.

Example 9

A chloroprene rubber of Example 9 was obtained in the same manner as in Example 1 except that the monomers to be fed in the initial stage of Example 1 were set to 320 g of the chloroprene monomer and 600 g of a styrene monomer, the monomer to be additionally added was set to 3600 g of the chloroprene monomer, and the final polymerization ratio was changed to 85%.

Example 10

A chloroprene rubber of Example 10 was obtained in the same manner as in Example 1 except that the monomers to be fed in the initial stage of Example 1 were set to 320 g of the chloroprene monomer, 160 g of 2,3-dichloro-1,3-butadiene monomer, and 480 g of a styrene monomer, the monomer to be additionally added was set to 3040 g of the chloroprene monomer, and the final polymerization ratio was changed to 85%.

Example 11

A chloroprene rubber of Example 11 was obtained in the same manner as in Example 1 except that the monomers to be fed in the initial stage of Example 1 were set to 320 g of the chloroprene monomer and 800 g of n-butyl acrylate monomer, and the monomer to be additionally added was changed to 2980 g of the chloroprene monomer.

Example 12

A chloroprene rubber of Example 12 was obtained in the same manner as in Example 1 except that monomers to be fed in the initial stage of Example 1 were set to 600 g of the chloroprene monomer and 1200 g of acrylonitrile monomer, and the monomer to be additionally added was changed to 2200 g of the chloroprene monomer.

Comparative Example 1

To a polymerization can of an inner volume of 10 liters, 4000 g of a chloroprene monomer, 16 g of diethylxanthogen disufide, 4000 g of pure water, 160 g of disproportionated potassium rosinate (manufactured by Harima Chemicals Group, Inc.), 9.2 g of sodium hydroxide, and 20 g of a sodium salt of a condensation product of β-naphthalenesulfonic acid and formalin (DEMOL N: manufactured by Kao Corporation) were added. 2% potassium persulfate aqueous solution was added as a polymerization initiator, and polymerization was performed at a polymerization temperature of 35° C. under a nitrogen gas flow. When the polymerization ratio reached 70%, diethylhydroxyamine was added as a polymerization terminator to terminate the polymerization. After removal of the unreacted monomer by distillation under reduced pressure, the pH of the chloroprene-based polymer (chloroprene latex) was adjusted to 7.0 using dilute acetic acid. Then, a chloroprene rubber was obtained by means of a freeze coagulation and drying method.

Comparative Example 2

A chloroprene rubber of Comparative Example 2 was obtained in the same manner as in Comparative Example 1 except that diethylxanthogen disufide of Comparative Example 1 was changed to 8.8 g of dodecyl mercaptan.

Comparative Example 3

A chloroprene rubber of Comparative Example 3 was obtained in the same manner as in Example 1 except that the final polymerization ratio of Example 1 was changed to 47%.

Comparative Example 4

A chloroprene rubber of Comparative Example 4 was obtained in the same manner as in Example 1 except that benzyl 1-pyrrolecarbodithioate (trivial name: benzyl pyrroledithiocarbamate) of Example 1 was changed to 3.2 g, potassium persulfate was changed to 0.37 g, and the chloroprene monomer was additionally added when the polymerization ratio of the initial monomer reached 80%.

[Calculation of Polymerization Ratio]

The polymerization ratio from the start of the polymerization to a certain time was calculated from a dry weight (solid concentration), which was determined after the chloroprene rubber latex was heated and air dried. Specifically, it was calculated by the expression (III) below. In the expression (III), the solid concentration is the concentration (% by mass) of the solid, which is obtained by heating 2 g of a sampled emulsion polymerization liquid at 130° C. to remove the solvent (water), volatile chemicals and raw materials, and removing the volatiles on the basis of the weight difference between before and after the heating. The total amount to be fed and the evaporation residue were calculated from the polymerization formulation. The total amount to be fed is the total amount of the raw materials, reagent, and solvent (water) fed in the polymerization can from the start of the polymerization to a certain time. The evaporation residue represents the weight of chemicals remaining as the solid along with the polymer, without volatilizing under a 130° C. condition, among the chemicals and raw materials fed from the start of the polymerization to a certain time. The amount of the monomer to be fed is the total amount of the monomer initially fed in the polymerization can and the monomer fed from the start of the polymerization to a certain time. Note that, in the case of copolymerization of the chloroprene monomer and other monomer, the amount of the monomer to be fed is the total amount the monomers.

Polymerization ratio [%]={(total amount to be fed [g]×solid concentration [% by mass]/100)−(evaporation residue [g])}/amount of the monomer to be fed [g]×100   (III)

[Determination Method of Composition of Copolymer]

The content of each unit of 2,3-dichloro-1,3-butadiene, styrene, and n-butyl acrylate in the copolymer was determined by a known method by means of 1H-NMR measurement. The content of the acrylonitrile unit was calculated from the content of the nitrogen atom determined by chemical analysis.

[Measurement of Mooney Viscosity]

The Mooney viscosity was measured for the chloroprene rubber at 100° C. in compliance with JIS K 6300.

[Production of Vulcanized Rubber]

To 100 parts by mass of the above chloroprene rubber, 1 part by mass of stearic acid, 2 parts by mass of octylated diphenylamine, 4 parts by mass of magnesium oxide, 40 parts by mass of carbon black (SRF), and 5.0 parts by mass of zinc oxide were added, and mixing was performed using a 8-inch roll, and press-crosslinking was performed at 160° C. for 20 minutes to produce a vulcanized rubber.

[Measurement of Tensile Strength and Elongation at Break]

A vulcanized sheet test piece of 2 mm in thickness was produced from the obtained vulcanized rubber, and a tensile test was run based on JIS K 6251 to measure the tensile strength (MPa) and elongation at break (%) of the vulcanized rubber.

[Hardness]

A test was run on the obtained vulcanized rubber based on JIS K 6253 to measure the hardness.

[Demattia Flex Fatigue Test]

With respect to the obtained vulcanized rubber, in compliance with the Demattia flex fatigue test of JIS K 6260, the number of runs of a flex test (unit: 10000 times) at the time of the occurrence of cracking under conditions of a stroke of 58 mm and a speed of 300±10 rpm was checked to evaluate the durability and fatigue endurance. The measurement was performed up to 2000000 times. More than 1000000 times were considered to be acceptable. Samples in which no cracking occurred at 2000000 times were noted as 2000000 times in the table.

[Preparation of Adhesive]

50 parts by mass of an alkyl phenol resin (TAMANOL 526: manufactured by Arakawa Chemical Industries, Ltd.) and 3 parts by mass of magnesium oxide (Kyowamag #150: manufactured by Kyowa Chemical Industry Co., Ltd.) were dissolved in 100 parts by mass of cyclohexane, and chelating-reaction was performed at room temperature for 16 hours. Then, to this cyclohexane solution, 100 parts by mass of the chloroprene rubber, 3 parts by mass of magnesium oxide, 1 part by mass of zinc oxide, 90 parts by mass of cyclohexane, 190 parts by mass of methyl ethyl ketone were added, and mixing and stirring were performed until the chloroprene rubber was completely dissolved to thereby obtain an adhesive.

[Measurement of Viscosity of Adhesive]

After the adhesive was produced, the viscosity at 25° C. was measured using a Brookfield type viscometer.

[Layer Separation Resistance Test of Adhesive]

The adhesive was placed in a glass vessel and stored in a thermostat water bath at 23° C. under a light-shielded condition. The appearance of the adhesive was observed for 8 weeks, and the week during which separation of the adhesive component was observed was noted, and six weeks or more was considered to be acceptable.

[Normal Adhesive Peel Strength]

Each of adhesives of Example and Comparative Example was applied at 3000 g/m$^2$ onto each of two canvas clothes (25 mm×150 mm). Thereafter, the open time was set to 30 minutes, and a hand roller was reciprocated thereon 5 times. Then, the initial strength 1 day after the set time and the normal strength after 10 days were measured at a tensile strength of 50 mm/min.

[Heat-Resistant Adhesive Peel Strength]

Each of adhesives of Example and Comparative Example was applied at 3000 g/m$^2$ onto each of two canvas clothes (25 mm×150 mm). Thereafter, the open time was set to 30 minutes, and a hand roller was reciprocated thereon 5 times. Then, the adherend 10 days after the set time was measured for peel strength by a tensile tester equipped with a thermostat at 80° C. under a 50 mm/min condition.

[Softening Point Test]

Each of adhesives of Example and Comparative Example was applied at 3000 g/m$^2$ onto each of two canvas clothes (25 mm×150 mm). Thereafter, the open time was set to 30 minutes, and a hand roller was reciprocated thereon 5 times. Then, the specimen 10 days after the set time, with a 500 g weight hanging therefrom, was set in a test apparatus, and 38° C. atmosphere was kept inside the test apparatus for 15 minutes, and then, the temperature was raised with a rate of 2° C. per 5 minutes, and the temperature at which the weight fell off was measured.

The above results are summarized in Tables 1 and 2. In the tables, "parts by mass" shows the proportion when the amount of the total monomers was set to 100 parts by mass.

TABLE 1

| | | | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|---|
| Polymer structure | | Functional group | ⟨N⟩−C(=S)−S− | ⟨N⟩−C(=S)−S− | ⟨N⟩−C(=S)−S− | BuS−C(=S)−S− | −S−C(=S)−S− | ⟨N⟩−C(=S)−S− | ⟨N⟩−C(=S)−S− | ⟨N⟩−C(=S)−S− | ⟨N⟩−C(=S)−S− | ⟨N⟩−C(=S)−S− | ⟨N⟩−C(=S)−S− | ⟨N⟩−C(=S)−S− |
| | Mn | 10⁴ g/mol | 15.4 | 18.3 | 30.0 | 17.2 | 17.8 | 15.8 | 23.9 | 16.3 | 17.2 | 17.6 | 18.3 | 15.4 |
| | Mw/Mn | 10⁴ g/mol | 2.14 | 2.20 | 2.45 | 2.40 | 2.44 | 1.73 | 3.86 | 2.02 | 3.36 | 2.45 | 2.30 | 2.62 |
| | Chloroprene | Parts by mass | 100 | 100 | 100 | 100 | 100 | 100 | 100 | 93 | 90 | 83 | 85 | 80 |
| | 2,3-Dichloro-1,3-butadiene | Parts by mass | — | — | — | — | — | — | — | 7 | — | 7 | — | — |
| | Styrene | Parts by mass | — | — | — | — | — | — | — | — | 10 | 10 | — | — |
| | n-Butyl acrylate | Parts by mass | — | — | — | — | — | — | — | — | — | — | 15 | — |
| | Acrylonitrile | Parts by mass | — | — | — | — | — | — | — | — | — | — | — | 20 |
| Polymerization condition | Emulsifier concentration of aqueous solution (B) | wt % | 4.0 | 4.0 | 4.0 | 4.0 | 4.0 | 4.0 | 4.0 | 4.0 | 4.0 | 4.0 | 4.0 | 4.0 |
| | Amount of aqueous solution (B) to be added | Parts by mass | 833 | 833 | 833 | 833 | 833 | 833 | 833 | 833 | 833 | 833 | 833 | 833 |
| | [M]₀/[CTA] | — | 243 | 253 | 396 | 252 | 263 | 203 | 243 | 217 | 142 | 162 | 162 | 162 |
| | Polymerization ratio at start of additional addition | % | 30 | 30 | 30 | 30 | 30 | 30 | 30 | 30 | 30 | 30 | 30 | 30 |
| | Amount of monomer to be additionally added | Parts by mass | 733 | 733 | 733 | 733 | 733 | 750 | 733 | 750 | 875 | 766 | 733 | 733 |
| | Final polymerization ratio | % | 70 | 70 | 80 | 70 | 70 | 65 | 95 | 65 | 85 | 85 | 70 | 70 |
| Chloroprene rubber Rubber physical properties | Mooney viscosity | — | 46 | 50 | 98 | 56 | 58 | 46 | 67 | 47 | 49 | 48 | 54 | 44 |
| | Tensile strength | MPa | 22.4 | 23.2 | 24.9 | 23.4 | 23.0 | 20.2 | 20.1 | 20.9 | 25.6 | 23.4 | 20.2 | 26.8 |
| | Elongation at break | % | 390 | 390 | 400 | 380 | 390 | 440 | 380 | 420 | 430 | 440 | 420 | 510 |

TABLE 1-continued

| | | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| | Hardness  Shore A | 70 | 69 | 70 | 71 | 70 | 70 | 70 | 72 | 72 | 73 | 67 | 73 |
| | Durability and fatigue endurance  10000 times | 200 | 200 | 200 | 200 | 200 | 200 | 167 | 200 | 200 | 133 | 163 | 200 |
| Adhesive physical properties | Viscosity  mPa·s | 3010 | 3020 | 2980 | 3120 | 2990 | 2880 | 3100 | 3080 | 3010 | 2980 | 3110 | 3030 |
| | Normal adhesive peel strength  N/mm | 11.2 | 12.6 | 13.0 | 12.9 | 13.0 | 11.3 | 12.9 | 11.1 | 11.2 | 9.9 | 11.6 | 11.2 |
| | Heat-resistant adhesive peel strength  N/mm | 1.9 | 2.1 | 2.4 | 2.1 | 2.2 | 1.7 | 1.6 | 2.1 | 2.4 | 2.5 | 1.8 | 1.8 |
| | Softening point  °C. | 82 | 85 | 90 | 81 | 80 | 82 | 84 | 84 | 86 | 90 | 92 | 96 |
| | Layer separation resistance  Weeks | 8 | 8 | 8 | 8 | 8 | 8 | 8 | 8 | 8 | 8 | 8 | 8 |

TABLE 2

| | | | Comparative Example 1 | Comparative Example 2 | Comparative Example 3 | Comparative Example 4 |
|---|---|---|---|---|---|---|
| Polymer structure | Functional group | — | — | EtO-C(=S)-S— | $C_{12}H_{25}S-$ | pyrrole-N-C(=S)-S— | pyrrole-N-C(=S)-S— |
| | Mn | $10^4$ g/mol | 20.6 | 15.4 | 12.3 | 35.5 |
| | Mw/Mn | $10^4$ g/mol | 2.51 | 2.63 | 1.78 | 3.36 |
| | Chloroprene | Parts by mass | 100 | 100 | 100 | 100 |
| Polymerization condition | Emulsifier concentration of aqueous solution (B) | wt % | — | — | 4.0 | 4.0 |
| | Amount of aqueous solution (B) to be added | Parts by mass | — | — | 833 | 833 |
| | $[M]_0/[CTA]$ | — | — | — | 243 | 396 |
| | Polymerization ratio at start of additional addition | % | — | — | 30 | 80 |
| | Amount of monomer to be additionally added | Parts by mass | — | — | 733 | 733 |
| | Final polymerization ratio | % | 70 | 70 | 47 | 70 |
| Chloroprene rubber | Mooney viscosity | — | 68 | 48 | 30 | Unmeasurable |
| Rubber physical properties | Tensile strength | MPa | 20.5 | 20.1 | 18.8 | Unprocessable |
| | Elongation at break | % | 390 | 340 | 290 | |
| | Hardness | Shore A | 71 | 70 | 69 | |
| | Durability and fatigue endurance | 10000 times | 33 | 62 | 35 | |
| Adhesive physical properties | Viscosity | mPa × s | 3010 | 2980 | 3000 | 2890 |
| | Normal adhesive peel strength | N/mm | 11.0 | 10.0 | 8.3 | 12.3 |
| | Heat-resistant adhesive peel strength | N/mm | 1.6 | 1.3 | 0.8 | 1.9 |
| | Softening point | °C. | 78 | 75 | 73 | 87 |
| | Layer separation resistance | Weeks | 1 | 2 | 5 | 5 |

In the chloroprene-based polymers each obtained in Examples and Comparative Examples, the functional group derived from the chain transfer agent [CTA] shown in the tables was detected by 1H-NMR measurement.

The vulcanized rubbers obtained from the chloroprene rubbers of Examples were more excellent in durability and fatigue endurance than that of Comparative Examples. Additionally, the tensile strength and elongation at break of the vulcanized rubbers of Examples were equivalent to or slightly better than those of Comparative Examples, and the hardness of the vulcanized rubbers of Examples was equivalent to that of Comparative Examples. From these results, it has been confirmed that the chloroprene rubber of the present invention can enhance the durability and fatigue endurance of a vulcanized rubber without influencing the rubber physical properties.

The adhesives obtained from the chloroprene rubbers of Examples were more excellent in layer separation resistance than that of Comparative Examples. Additionally, the normal adhesive peel strength, heat-resistant adhesive peel strength, and softening point of the vulcanized rubbers of Examples were equivalent to those of Comparative Examples. From these results, it has been confirmed that the chloroprene rubber of the present invention can enhance layer separation resistance of an adhesive without influencing the adhesive physical properties.

The chloroprene rubbers of Comparative Examples 1 and 2 had no functional group of a structure represented by the above general formula (1) or (2). The number average molecular weight of the chloroprene rubber of Comparative Example 3 was less than 150000. The vulcanized rubbers obtained from these Comparative Examples were inferior in durability and fatigue endurance, and the layer separation resistance of the adhesives obtained therefrom was low. In the case of the chloroprene rubber of Comparative Example 4 having number average molecular weight exceeded 300000, the formulated product was stiff due to the high viscosity, and it was not possible to mold a uniform molded product, and thus, it was not possible to process for obtaining a vulcanized rubber. Additionally, the layer separation resistance of the adhesive of Comparative Example 4 was low.

The present invention can also take aspects as follows.

[1] A chloroprene-based polymer having a number average molecular weight Mn of 150000 to 300000 and comprising a functional group of a structure represented by the general formula (1) or (2) below:

[Chemical Formula 10]

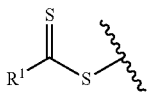
(1)

[Chemical Formula 11]

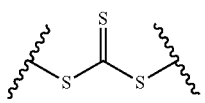
(2)

(wherein in the general formula (1), R¹ shows hydrogen, chlorine, a substituted or unsubstituted alkyl group, a substituted or unsubstituted alkenyl group, a substituted or unsubstituted aryl group, or a substituted or unsubstituted heterocyclyl group.)

[2] The chloroprene-based polymer according to [1], comprising a functional group of a structure represented by the above general formula (1).

[3] The chloroprene-based polymer according to [1] or [2], wherein a molecular weight distribution Mw/Mn, as a ratio of the weight average molecular weight Mw to the number average molecular weight Mn, is 1.5 to 5.0.

[4] The chloroprene-based polymer according to any one of [1] to [3], being a homopolymer of a chloroprene monomer.

[5] The chloroprene-based polymer according to any one of [1] to [3], being a statistical copolymer consisting of a chloroprene monomer and a monomer copolymerizable with the chloroprene monomer.

[6] The chloroprene-based polymer according to [5], wherein the monomer copolymerizable with the chloroprene monomer is at least one selected from the group consisting of 2,3-dichloro-1,3-butadiene, 1-chloro-1,3-butadiene, acrylic acid, an acrylate, methacrylic acid, a methacrylate, acrylamide, an unsaturated nitrile, and an aromatic vinyl compound.

[7] A method for producing the chloroprene-based polymer according to any one of [1] to [6], wherein
a solution (A) in which a chain transfer agent represented by the general formula (3) or (4) below is added to 100 parts by mass of a total monomer to achieve a ratio of an amount of substance of the total monomer to that of the chain transfer agent [M]₀/[CTA] at a start of polymerization of 5/1 to 500/1 and 500 to 5000 parts by mass of an aqueous solution (B) of 0.1 to 10% by mass of an emulsifier are mixed and emulsified, then, radical polymerization is performed, and 100 to 5000 parts by mass of a chloroprene monomer singly or of a chloroprene monomer and a monomer copolymerizable with the chloroprene monomer is/are additionally added when a polymerization ratio reaches 20 to 50%:

[Chemical Formula 12]

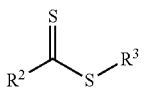
(3)

[Chemical Formula 13]

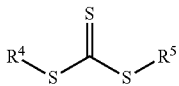
(4)

(wherein in the general formula (3), R² shows hydrogen, chlorine, a substituted or unsubstituted alkyl group, a substituted or unsubstituted alkenyl group, a substituted or unsubstituted aryl group, or a substituted or unsubstituted heterocyclyl group; and in the general formulas (3) and (4), $R^{3\ to\ 5}$ each independently show a substituted or unsubstituted alkyl group, a substituted or unsubstituted and saturated or unsaturated aromatic carbocycle, a substituted or unsubstituted and saturated or unsaturated aromatic heterocycle, an organometallic species, or any polymer chain.)

[8] The method for producing the chloroprene-based polymer according to [7], wherein a final polymerization ratio after the additional addition is 50% or more.

[9] The method for producing the chloroprene-based polymer according to [7] or [8], wherein the chain transfer agent represented by the above general formula (3) is added.

[10] A composition comprising the chloroprene-based polymer according to any one of [1] to [6].

[11] The composition according to [10], further comprising at least one selected from the group consisting of a natural rubber, an isoprene rubber, a butyl rubber, a nitrile rubber, a hydrogenated nitrile rubber, a butadiene rubber, a styrene butadiene rubber, and an ethylene propylene rubber.

[12] An adhesive composition comprising the composition according to [10] or [11].

[13] An adhesive comprising the adhesive composition according to [12].

[14] The adhesive composition according to [12] or the adhesive according to [13], wherein a layer separation resistance is 8 weeks or more.

[15] A vulcanized rubber comprising the composition according to [10] or [11].

[16] The vulcanized rubber according to [15], wherein there is no cracking when Demattia flex fatigue test has been run one million times.

[17] An antivibration rubber, a belt, a component for an overhead vehicle, an antiseismic rubber, a hose, a wiper, an immersion product, a seal component, boots, a rubberized cloth, a rubber roll, or a sponge product, wherein the vulcanized rubber according to [15] or [16] is used.

[18] A latex comprising the chloroprene-based polymer according to any one of [1] to [6].

[19] The latex according to [18], being for an adhesive or for a vulcanized rubber.

The invention claimed is:

1. A chloroprene-based polymer having a number average molecular weight Mn of 150000 to 300000, wherein the chloroprene-based polymer is a homopolymer of a chloroprene monomer and further comprises a functional group of a structure represented by the general formula (1) or (2) below:

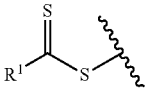
(1)

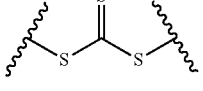
(2)

wherein in the general formula (1), R¹ represents hydrogen, chlorine, a substituted or unsubstituted alkyl group, a substituted or unsubstituted alkenyl group, a substituted or unsubstituted aryl group, or a substituted or unsubstituted heterocyclyl group, wherein the chloroprene-based polymer has a molecular weight distribution Mw/Mn, as a ratio of a weight average molecular weight Mw to the number average molecular weight Mn, of 1.5 to 5.0.

2. The chloroprene-based polymer according to claim 1, comprising a functional group of a structure represented by the above general formula (1).

3. A method for producing the chloroprene-based polymer according to claim 1, wherein a solution (A) in which a chain transfer agent represented by the general formula (3) or (4) below is added to 100 parts by mass of a total monomer to achieve a ratio of an amount of substance of the total monomer to that of the chain transfer agent $[M]_0/[CTA]$ at a start of polymerization of 5/1 to 500/1 and 500 to 5000 parts by mass of an aqueous solution (B) of 0.1 to 10% by mass of an emulsifier are mixed and emulsified, then, radical polymerization is performed, and 100 to 5000 parts by mass of a chloroprene monomer singly is additionally added when a polymerization ratio reaches 20 to 50%:

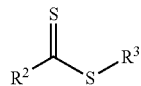
(3)

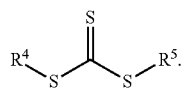
(4)

wherein in the general formula (3), $R^2$ represents hydrogen, chlorine, a substituted or unsubstituted alkyl group, a substituted or unsubstituted alkenyl group, a substituted or unsubstituted aryl group, or a substituted or unsubstituted heterocyclyl group; and in the general formulas (3) and (4), $R^3$—$R^5$ each independently represents a substituted or unsubstituted alkyl group, a substituted or unsubstituted and saturated or unsaturated aromatic carbocycle, a substituted or unsubstituted and saturated or unsaturated aromatic heterocycle, an organometallic species, or any polymer chain.

4. The method for producing the chloroprene-based polymer according to claim 3, wherein the chain transfer agent represented by the above general formula (3) is added.

5. A composition comprising the chloroprene-based polymer according to claim 1.

6. An adhesive composition comprising the composition according to claim 5.

7. A vulcanized rubber comprising the composition according to claim 5.

8. The vulcanized rubber according to claim 7, wherein there is no cracking when Demattia flex fatigue test has been run one million times.

9. An antivibration rubber, a belt, a component for an overhead vehicle, an antiseismic rubber, a hose, a wiper, an immersion product, a seal component, boots, a rubberized cloth, a rubber roll, or a sponge product, wherein the vulcanized rubber according to claim 7 is utilized.

10. A latex comprising the chloroprene-based polymer according to claim 1.

11. A chloroprene-based polymer having a number average molecular weight Mn of 150000 to 300000, wherein the chloroprene-based polymer is a statistical copolymer consisting of a chloroprene monomer and a monomer copolymerizable with the chloroprene monomer and further comprises a functional group of a structure represented by the general formula (1) or (2) below:

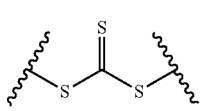
(1)

(2)

wherein in the general formula (1), $R^1$ represents hydrogen, chlorine, a substituted or unsubstituted alkyl group, a substituted or unsubstituted alkenyl group, a substituted or unsubstituted aryl group, or a substituted or unsubstituted heterocyclyl group.

12. The chloroprene-based polymer according to claim 11, comprising a functional group of a structure represented by the above general formula (1).

13. The chloroprene-based polymer according to claim 11, wherein a molecular weight distribution Mw/Mn, as a ratio of a weight average molecular weight Mw to the number average molecular weight Mn, is 1.5 to 5.0.

14. The chloroprene-based polymer according to claim 11, wherein the monomer copolymerizable with the chloroprene monomer is at least one selected from the group consisting of 2,3-dichloro-1,3-butadiene, 1-chloro-1,3-butadiene, acrylic acid, an acrylate, methacrylic acid, a methacrylate, acrylamide, an unsaturated nitrile, and an aromatic vinyl compound.

15. A method for producing the chloroprene-based polymer according to claim 11, wherein a solution (A) in which a chain transfer agent represented by the general formula (3) or (4) below is added to 100 parts by mass of a total monomer to achieve a ratio of an amount of substance of the total monomer to that of the chain transfer agent $[M]_0/[CTA]$ at a start of polymerization of 5/1 to 500/1 and 500 to 5000 parts by mass of an aqueous solution (B) of 0.1 to 10% by mass of an emulsifier are mixed and emulsified, then, radical polymerization is performed, and 100 to 5000 parts by mass or of a chloroprene monomer and a monomer copolymerizable with the chloroprene monomer are additionally added when a polymerization ratio reaches 20 to 50%:

(3)

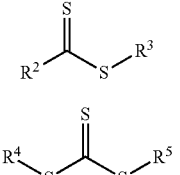
(4)

wherein in the general formula (3), $R^2$ represents hydrogen, chlorine, a substituted or unsubstituted alkyl group, a substituted or unsubstituted alkenyl group, a substituted or unsubstituted aryl group, or a substituted or unsubstituted heterocyclyl group; and in the general formulas (3) and (4), $R^3$—$R^5$ each independently represents a substituted or unsubstituted alkyl group, a substituted or unsubstituted and saturated or unsaturated aromatic carbocycle, a substituted or unsubstituted and saturated or unsaturated aromatic heterocycle, an organometallic species, or any polymer chain.

16. The method for producing the chloroprene-based polymer according to claim 15, wherein the chain transfer agent represented by the above general formula (3) is added.

17. A composition comprising the chloroprene-based polymer according to claim 11.

18. An adhesive composition comprising the composition according to claim 17.

19. A vulcanized rubber comprising the composition according to claim 17.

20. The vulcanized rubber according to claim 19, wherein there is no cracking when Demattia flex fatigue test has been run one million times.

21. An antivibration rubber, a belt, a component for an overhead vehicle, an antiseismic rubber, a hose, a wiper, an immersion product, a seal component, boots, a rubberized cloth, a rubber roll, or a sponge product, wherein the vulcanized rubber according to claim 19 is used.

22. A latex comprising the chloroprene-based polymer according to claim 11.

* * * * *